United States Patent
Bove et al.

(10) Patent No.: US 7,090,061 B2
(45) Date of Patent: Aug. 15, 2006

(54) SNAP RING

(75) Inventors: Nelson David Bove, Cincinati, OH (US); Jeffrey Alan Miller, Cincinnati, OH (US); Larry Francis Traficant, Westchester, OH (US); Jay Robert Deller, Fairfield, OH (US); Thomas Frederick McGill, Cincinnati, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 206 days.

(21) Appl. No.: 10/248,456

(22) Filed: Jan. 21, 2003

(65) Prior Publication Data

US 2003/0223809 A1 Dec. 4, 2003

Related U.S. Application Data

(60) Provisional application No. 60/384,051, filed on May 29, 2002.

(51) Int. Cl.
*F16B 21/18* (2006.01)

(52) U.S. Cl. .................. 192/70.2; 403/202; 403/316; 403/319; 411/517; 411/353

(58) Field of Classification Search .............. 403/202, 403/203, 315–317, 319, 365; 192/70.2; 411/517, 411/518, 353
See application file for complete search history.

(56) References Cited

U.S. PATENT DOCUMENTS

| | | | | |
|---|---|---|---|---|
| 1,512,020 | A * | 10/1924 | Graham | 384/561 |
| 1,970,449 | A * | 8/1934 | Gibbons et al. | 384/570 |
| 2,322,138 | A * | 6/1943 | Jenny | 411/517 |
| 3,446,522 | A * | 5/1969 | Hoard | 411/518 |
| 4,014,619 | A | 3/1977 | Good et al. | |
| 4,182,579 | A | 1/1980 | McCormick et al. | |
| 4,343,581 | A | 8/1982 | Millheiser | |
| 4,558,962 | A * | 12/1985 | Meinlschmidt | 384/570 |
| 4,565,458 | A * | 1/1986 | Achee et al. | 384/561 |
| 5,915,875 | A | 6/1999 | Bodtker | |
| 5,937,985 | A * | 8/1999 | Dover et al. | 192/70.2 |
| 6,062,611 | A * | 5/2000 | Percebois et al. | 285/374 |
| 6,358,382 | B1 | 3/2002 | Stucki et al. | |

FOREIGN PATENT DOCUMENTS

| | | | |
|---|---|---|---|
| DE | 35 37 146 | * | 4/1987 |
| DE | 3537 146 A1 | | 4/1987 |

* cited by examiner

*Primary Examiner*—Daniel P. Stodola
*Assistant Examiner*—Michael P. Ferguson
(74) *Attorney, Agent, or Firm*—Raymond L. Coppiellie; Brooks & Kushman, P.C.

(57) ABSTRACT

A snap ring having improved retention characteristics is configured for use inside a cylindrical cavity. The cavity includes a retention device having a retention surface forming an obtuse angle with the cavity wall. As an axial load is applied to the snap ring, it moves along the retention surface, thereby experiencing a reduction in diameter. The snap ring includes a circumferential discontinuity defined by two generally radial planar surfaces, or ring ends. The discontinuity is configured such that the ring ends will abut one another before the snap ring diameter is reduced beyond the retaining diameter.

6 Claims, 2 Drawing Sheets

SNAP RING

CROSS REFERENCE TO RELATED APPLICATIONS

This application claims the benefit of U.S. provisional application Ser. No. 60/384,051, filed May 29, 2002.

BACKGROUND OF INVENTION

1. Field of the Invention

The present invention relates to a snap ring, and more particularly, a snap ring with improved retention characteristics.

2. Background Art

The use of snap rings as a retention device for mechanical components is well known. Some snap rings are designated "external", indicating their use on the outside of a component such as a shaft. Other snap rings are of the "internal" type, and are typically used inside cylindrical cavities, such as tubes, bored cylinders, and the like. When used inside a cavity, the snap ring may be provided with one of a number of different retention devices. For example, a groove may be machined into a cylinder wall, the groove being configured to retain the desired snap ring. In some cases, for example, with a relatively thin-walled tube, tabs may be formed in the tube wall to project inside the tube to retain the snap ring.

In use, a snap ring may experience an axial load; indeed, it is often the function of a snap ring to provide resistance to an axial load applied by one or more components. In such applications, it is important for the snap ring to be able to withstand the axial loading without becoming dislodged. This can be a particular problem for internal snap rings having retention devices, such as tabs, that are formed rather than machined. Specifically, forming operations often do not allow for the retention device to be reliably formed at a 90 degree angle to the cylinder wall. In many cases, the retention device will have a retaining ledge that forms an obtuse angle with the cylinder wall. Thus, as it is loaded, a snap ring may creep up the retaining ledge, thereby experiencing a reduction in diameter. The reduction in diameter may continue with additional or continued loading, until the snap ring diameter is below a minimum retaining diameter and retention is lost.

Accordingly, it is desirable to provide a snap ring having improved retention characteristics, and in particular, an internal snap ring configured to maintain retention in the presence of an axial load.

SUMMARY OF INVENTION

It is an aspect of the present invention to provide an improved snap ring that maintains retention in the presence of axial loads.

It is another aspect of the invention to provide an improved internal snap ring for use with retaining devices having retaining ledges disposed at an obtuse angle to a cavity sidewall.

It is a further aspect of the invention to provide an improved snap ring having a minimum outer diameter that exceeds the retaining diameter of the retaining device.

Accordingly, a retaining ring for use inside a generally cylindrical cavity is provided. The cavity has at least one retaining feature which has a first diameter. The retaining ring comprises a ring body having an outer body diameter, and a slot through the ring body. The slot is defined by a first ring end and a second ring end, and it is configured such that the outer body diameter exceeds the first diameter of the at least one retaining feature when the ring body is deflected such that the first ring end is abutted against the second ring end.

It is another aspect of the invention to provide a retaining ring for use inside a generally cylindrical cavity. The cavity has at least one retaining feature which has a first diameter. The retaining ring comprises a one-piece radially elastic ring body that includes a first annular surface defining an inside body diameter. The ring body also includes a second annular surface defining an outside body diameter. The ring body has a circumferential discontinuity therethrough. The discontinuity is defined by a first ring end disposed at a predetermined distance from a second ring end when the ring body is in free form. The predetermined distance is set such that the outside body diameter exceeds the first diameter of the at least one retaining feature when the ring body is loaded such that the first ring end contacts the second ring end.

Still another aspect of the invention is to provide a retaining ring for use inside a generally cylindrical cavity having a plurality of retention tabs circumferentially disposed within the cavity and defining a first tab diameter. The retaining ring comprises a ring body having an outer body diameter and a slot therethrough. The slot is defined by first and second ring ends, and it is configured such that the outer body diameter exceeds the first tab diameter when the ring body is deflected such that the first ring end is abutted against the second ring end.

Yet another aspect of the invention provides a method of installing a retaining ring inside a generally cylindrical cavity having a cavity opening. The cavity includes at least one retaining feature, which has a first diameter. The method comprises choosing a snap ring from an inventory of differently sized snap rings. The chosen snap ring has an outer body diameter exceeding the first diameter of the at least one retaining feature. A first ring end is then inserted into the cavity through the cavity opening. A second ring end is inserted into the cavity through the cavity opening such that the snap ring forms a helical coil inside the cavity. The snap ring is then displaced within the cavity until the snap ring abuts the at least one retaining feature.

The above object and other objects, features and advantages of the present invention are readily apparent from the following detailed description of the best modes for carrying out the invention when taken in connection with the accompanying drawings.

DETAILED DESCRIPTION

Figure 1:
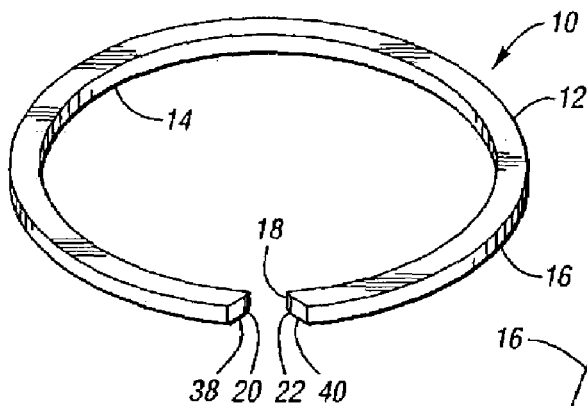
FIG. 1 is a perspective view of a snap ring in accordance with the present invention.
Figure 2:
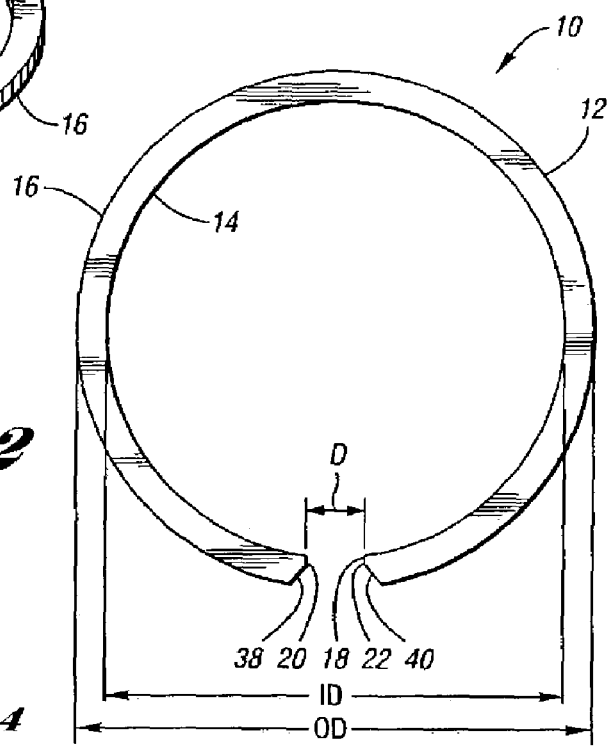
FIG. 2 is a top plan view of the snap ring shown in FIG. 1 illustrating some of the snap ring's free form dimensions.

FIG. 1 shows a retaining ring or snap ring 10 in accordance with the present invention. The snap ring 10 includes a one-piece ring body 12 having a first annular surface, or inner ring surface 14, and a second annular surface, or outer ring surface 16. The ring body 12 has a circumferential discontinuity, or slot 18 which is defined by a first ring end 20 and a second ring end 22. The first and second ring ends 20, 22 each have a generally flat surface oriented along a radial line of the snap ring 10. As best seen in FIG. 2, the ring body 12 includes an inner body diameter (ID) and an outer body diameter (OD). The inner ring surface 14 is disposed along a first circumference of the ring body 12 at the inner body diameter. Similarly, the outer ring surface 16 is disposed along a second circumference of the ring body 12 at the outer body diameter.

As shown in FIG. 2, the snap ring 10 is in free form—i.e., there are no external forces acting on it. As described more fully below, the snap ring 10 is an I.D. or internal type snap ring. It is often used inside a cylindrical cavity, or cylinder, to act as a retaining device for another component. In use, such a snap ring experiences external forces resulting in part from contact with the sidewalls of the cylinder. Therefore, the free form dimensions of the snap ring 10 as shown in FIG. 2 will differ from its loaded dimensions (see FIG. 5).

The ring body 12 shown in FIGS. 1 and 2 is radially elastic—i.e., it is configured to deform elastically when a radial load is applied. This occurs when the snap ring 10 is installed inside a cylinder having an inner diameter that is smaller than the snap ring's free form outside body diameter. The snap ring 10 is made from flat spring steel wire, though similar snap rings may be made from any suitable material. For example, the snap ring 10 may be made from annealed or oil tempered wire, hot rolled or cold drawn and annealed spring steel strip, or hard drawn wire. Other materials, for example, stainless steel or polymers such as polypropylene or nylon may also be suitable depending on the particular application. Because the snap ring 10 is made from a flat spring steel wire, it has a generally uniform rectangular radial cross section. When the snap ring 10 is in free form, the first ring end 20 is at a predetermined distance (D) from the second ring end 22 (see FIG. 2). The predetermined distance is chosen based size of the cylinder in which the snap ring will be used.

Figure 3:
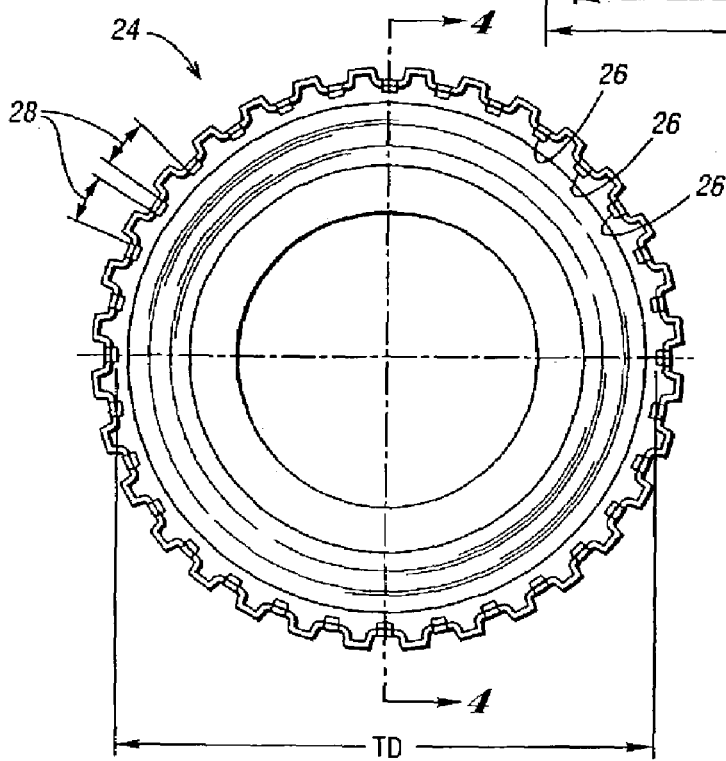
FIG. 3 is a top plan view of a cylinder in which the snap ring of FIGS. 1 and 2 may be used.

Choosing the correct predetermined distance requires a knowledge of the particular snap ring application. For example, FIG. 3 shows a top plan view of a cylinder 24 configured for use with the snap ring 10. The cylinder 24 is a type often used in a transmission, and in particular a coast clutch in the transmission. Of course, the snap ring 10 may be used with other types of cylinders, including cylinders used in non-transmission applications, and even those used in non-automotive applications. Circumferentially disposed around the inside of the cylinder 24 are retaining features or retention tabs 26. The retention tabs 26 have a first diameter, or first tab diameter (TD), which is measured across tabs oriented 180 degrees apart. The first tab diameter can also be called a retaining diameter, and is defined as the minimum diameter a component (e.g., a snap ring) may have while still maintaining contact with the retention tabs. The retention tabs 26 have circumferential spaces, or retention tab interstices 28 between them.

Figure 4:
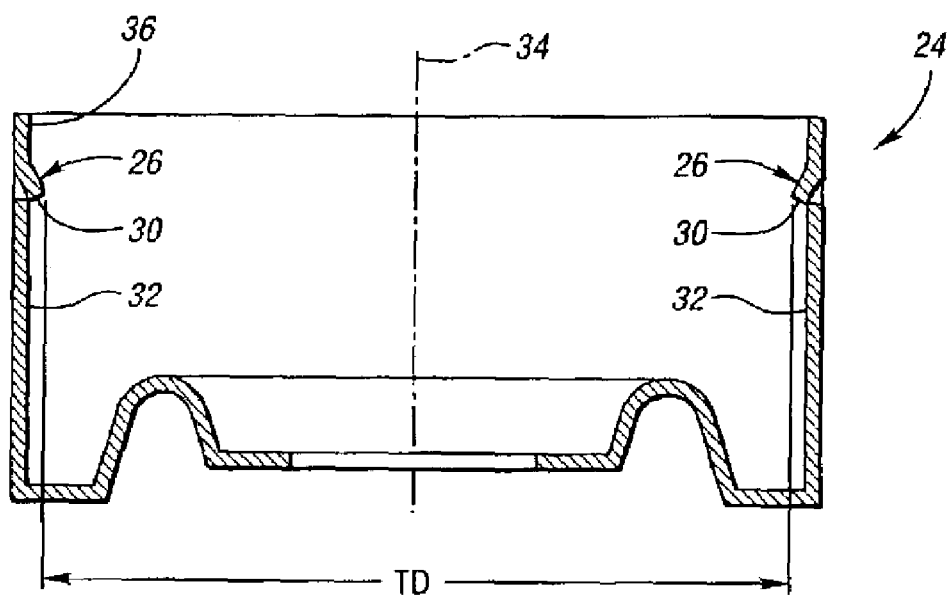
FIG. 4 is a sectional view of a part of the cylinder shown in FIG. 3.

The retention tabs 26 are also seen in FIG. 4, which is a partial section of the cylinder 24 taken through line 4—4 in FIG. 3. In FIG. 4, only one set of retention tabs 26 is shown, and much of the cylinder 24 has been removed for clarity. The obtuse angle between the retaining surfaces 30 and the sidewall 32 is a result of the manufacturing process by which the retention tabs 26 are formed. In a relatively thin-walled cylinder, such as the cylinder 24, retention tabs may be formed by a tool directed radially inward toward the center of the cylinder. This type of manufacturing process results in tabs, such as the retention tabs 26 shown in FIGS. 3 and 4, being formed inside the cylinder. It is worth noting that other cylinders may be configured with different retaining features, such as a retention groove rather than retention tabs. In a cylinder having a retention groove, a snap ring would seat inside the groove, and the retaining diameter could be defined by an inner diameter of the cylinder.

When it is initially installed, a portion of the snap ring 10 will contact the retaining surfaces 30 of the retention tabs 26. In addition, the outer ring surface 16 of the snap ring 10 will abut the sidewall 32 of the cylinder 24. During use, a pressure plate (not shown) will contact the snap ring 10, applying a force parallel to an axis 34 of the cylinder 24. In particular, the force exerted by the pressure plate is in an upward direction as viewed in FIG. 4. The pressure plate is a component of a transmission coast clutch, which is used here merely as one example of a particular application of the invention. Because internal snap rings are often used to retain mechanical components, the coast clutch application is illustrative of some of the benefits of the snap ring 10.

As the pressure plate (or another component in a different application) applies a load to the snap ring 10, the snap ring 10 tends to move upward and inward (as viewed in FIG. 4). This is because each of the retaining surfaces 30 forms an obtuse angle with the cylinder sidewall 32. Thus, there is a component of force acting on the snap ring 10 that tends to reduce its outer body diameter. With a conventional internal snap ring, this reduction in diameter would continue if the applied force were great enough. Eventually, the outer diameter of the snap ring would be equal to the retaining diameter of the retention tabs (or retention groove). Any further application of force to the snap ring would result in an additional reduction in snap ring diameter and ultimately a loss of retention—i.e., the snap ring would be dislodged.

Figure 5:
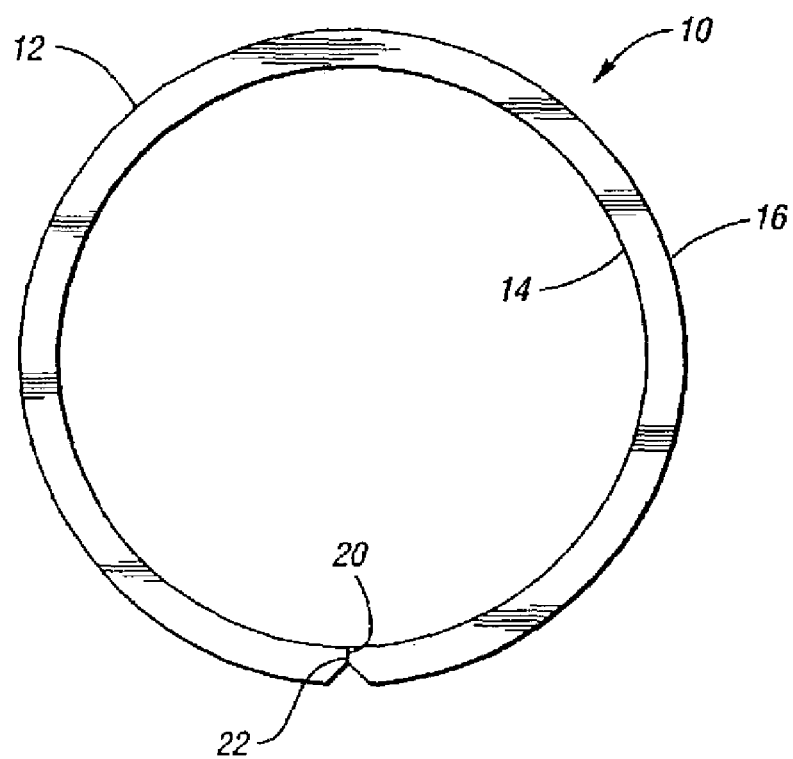
FIG. 5 is a top plan view of the snap ring shown in FIG. 1 in a loaded condition.

In contrast, the snap ring 10 is configured to ensure that retention is not lost, even in the presence of large axial loads and/or large retaining surface angles. This is because the predetermined distance between the first and second ring ends 20, 22 is minimized such that the outer body diameter of the snap ring 10 cannot be less than the retaining diameter of the retention tabs 26. Specifically, the predetermined distance is large enough to allow the snap ring 10 to be installed in the cylinder 24, but it is small enough that the first and second ring ends 20, 22 contact each other before the outer body diameter is reduced beyond the retaining diameter. This feature is illustrated in FIG. 5, which shows the snap ring 10 as it would appear with a radial load applied. The outer body diameter of the snap ring 10 has reached a minimum, beyond which no further reduction in diameter is possible.

When the outer body diameter of the snap ring 10 has reached a minimum, as shown in FIG. 5, the first ring end 20 abuts the second ring end 22. Because the first and second ring ends 20, 22 have flat surfaces oriented in a generally radial direction, they will remain in contact with each other, exhibiting little or no tendency to slip or lose contact. In addition to diametral stability, the snap ring 10 will also resist buckling. Buckling is a phenomenon that could be manifest when the two ring ends 20, 22 are forced into contact with one another. However, because the snap ring 10 will be disposed between a pressure plate and the retaining surfaces 30, the tendency to buckle is virtually eliminated. Hence, in the presence of an axial load forcing it along the retaining surfaces 30, the snap ring 10 will experience a limited reduction in diameter such that the outer body diameter will never be less than the retaining diameter. In this way, retention of the snap ring 10 is preserved even in the presence of large loads.

The snap ring 10 has a predetermined distance (D) that has both lower and upper limits. That is, the predetermined distance is small enough to ensure that the outer body diameter of the snap ring 10 is never smaller than the retaining diameter of the retention tabs 26, and it is large enough to ensure that the snap ring 10 can be easily installed in a cylinder, such as the cylinder 24. Thus, a snap ring should be properly sized for a particular application. For example, to use the snap ring 10 in the cylinder 24, the following steps may occur. The snap ring 10 is chosen from an inventory of differently sized snap rings. The snap ring 10 is chosen such that its minimum body diameter exceeds the retaining diameter of the retention tabs 26.

The first ring end 20 is then placed into the cylinder 24 through an opening 36 (see FIG. 4). The snap ring is rotated in a downward spiral toward the retention tabs 26, until the first ring end 20 goes through a retention tab interstice 28 and below the retention tabs 26. As the snap ring 10 is spiraled further downward, the second ring end 22 follows the first ring end 24 through the cylinder opening 36 and through the retention tab interstice 28. The snap ring 10 is now formed in a helical coil inside the cylinder 24, under the retention tabs 26. To facilitate the seating of the snap ring 10 against the retaining surfaces 30, the first and second ring ends 20, 22 each have a chamfer 38, 40, respectively, adjacent to the outer ring surface 16. The chamfers 38, 40 make it easier to seat the snap ring 10 when there is some overlap of the first and second ring ends 20, 22 during installation. Once installed, the snap ring 10 will maintain retention during service, since its minimum outer body diameter will never be less than the retaining diameter of the retention tabs 26.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A retaining ring system, comprising:
a coast clutch cylinder defining a cylinder axis and having a plurality of retention tabs circumferentially disposed therein, the retention tabs defining a tab diameter; and
a retaining ring including a one-piece radially elastic ring body having a first annular surface defining an inside body diameter and a second annular surface defining an outside body diameter, the ring body having a circumferential discontinuity therethrough, the discontinuity being defined by a first ring end disposed at a positive predetermined distance from a second ring end when the ring body is in free form, the predetermined distance being set such that the outside body diameter exceeds the tab diameter when the ring body is loaded such that the first ring end contacts the second ring end, the predetermined distance being further set such that the first and second ring ends remain separated by at least some of the predetermined distance when the retaining ring is initially installed in the cylinder.

2. The retaining ring system of claim 1, wherein each of the retention tabs are configured with respective retaining surfaces which cooperate with the ring body to facilitate retention of the ring body within the cylinder when an axial force parallel to the cylinder axis is applied to the ring body in the direction of the retention tabs.

3. The retaining ring system of claim 2, wherein each of the retaining surfaces forms an obtuse angle with a sidewall of the cylinder such that the outside body diameter of the ring body is reduced as the ring body contacts the retaining surfaces in the presence of the axial force.

4. The retaining ring system of claim 3, wherein the first ring end and the second ring end each include a generally radial flat surface.

5. The retaining ring system of claim 3, wherein the first ring end and the second ring end each have a chamfer adjacent the second annular surface, thereby facilitating seating of the retaining ring.

6. The retaining ring system of claim 3, wherein the ring body includes a generally uniform rectangular radial cross section.

* * * * *